US005554278A

United States Patent [19]

[11] Patent Number: 5,554,278

[45] Date of Patent: Sep. 10, 1996

Henderson

[54] QUICK CHANGE OIL RECYCLER

[76] Inventor: Bruce L. Henderson, 425 W. 9th, Concordia, Kans. 66901

[21] Appl. No.: 253,332

[22] Filed: Jun. 3, 1994

[51] Int. Cl.[6] .......... B01D 35/02

[52] U.S. Cl. .......... 210/136; 210/171; 210/172; 210/416.4; 210/418; 123/575; 184/1.5

[58] Field of Search .......... 210/167, 168, 210/171, 416.4, 416.5, 136, 172, 418; 184/1.5; 123/196 M, 198 DA, 575

[56] References Cited

PUBLICATIONS

Cummins Service Products Company Bulletin No. 3377614 Titled—Fuel/Lube Oil Blender, dated Jun. 1992.

*Primary Examiner*—Matthew O. Savage

*Attorney, Agent, or Firm*—Edward L. Brown, Jr.

[57] ABSTRACT

A closed fuel and used motor oil mixing system that is permanently attached to the oil pan and fuel system, and adds oil to the fuel system for combustion with the fuel. The attachment points to the fuel system can be along the return fuel line for deposit into the fuel tank, directly to the fuel tank, or to a drip oiler which drips the oil directly into the top cylinder areas. The system pumps used oil from the oil pan and filters out the particulate matter held in suspension in the oil, before delivering the filtered oil into the fuel system. A valve prevents oil from exiting the oil pan until desired.

4 Claims, 1 Drawing Sheet

QUICK CHANGE OIL RECYCLER

BACKGROUND OF THE INVENTION

This invention relates in general to an apparatus for the recycling of used engine oil in internal combustion engines, and more particularly it relates to a permanent recycling system that removes used oil from an engine's oil pan and allows it to be combusted with fuel. The used oil is filtered to remove particulate matter greater than 5 microns, and either immediately added to fuel in the storage tank in suitable proportions to the fuel, stored for a delayed addition to the fuel tank, or stored for use with an inverse oiler system.

The disposal of used oil is an ecological concern. Large engines, such as those in semi tractor trailer trucks, construction equipment and boats, require proper disposal of large volumes of oil at each oil change. Many tractor trailer trucks, for example, require the disposal of ten gallons of used oil at each oil change.

The Environmental Protection Agency will allow used oil to be mixed in certain proportions with fuel, and burned with the fuel during engine operation, so as to dispose of the oil with a minimal smoke pollutant, rather than a liquid waste. Used oil may be properly added to diesel fuel in a ration of 1:20 oil to fuel, and a ratio of 1:160 for gasoline.

There are certain advantages for engines to burn small amounts of oil with their fuel. When oil is burned with fuel, it prevents friction and corrosion damage in the top of the cylinder.

Condensation of water vapor in the combustion chamber is inherent with the burning of petroleum-based fuels. When a gallon of gasoline is burned in an engine, it creates nearly a gallon of water, in vapor form, in the engine. The resultant water contacts the inner walls of the engine's cylinders, causing the metal to undergo a slight but ongoing oxidation or rusting process during operation.

Engine wear is also accomplished through friction. As an engine operates, the moving parts engage each other, with the resulting friction compromising the part's outer surface integrity, degrading the overall efficiency of the engine. The friction occurring inside the cylinder, causes exaggerated wear, due to the ongoing rusting of the cylinder wall.

Lubricating oils are used, to provide a barrier between the outer surfaces of the moving parts, so as to lessen the amount of friction between them, and reduce overall wear of the engine. In a majority of engines, the oil is stored in an oil pan and is pumped or splashed to the areas it is needed, but very little oil gets by the rings into the top of the cylinder where the combustion of fuel takes place.

The upper cylinder head areas, such as the rings, valves and inner cylinder walls, suffer some of the greatest wear due to heat friction and corrosion. It has been previously recognized that the addition of oil into the upper cylinder area substantially reduces engine wear.

A number of prior apparatus applications, in 4-cycle engines, have sought to reduce wear in the upper cylinder area, by adding oil directly to the upper cylinders. The "Marvel Inverse Oiler," from the Marvel Oil Company, Inc., disclosed in Marvel Form No. C-90-M, is intake manifold vacuum actuated, providing a top cylinder lubrication system. The lubricant can be fed directly into an operating engine through a drip system, to provide lubricant for the upper cylinder areas.

An apparatus for processing and blending used oil with fuel is currently marketed by Cummins Service Products Company, Bulletin No. 3377614, Columbus, Ind., in which a "Blender" is used to direct the used oil to the fuel tanks. This apparatus is designed to primarily remain in one location, and provide service to trucks as they come in for their oil changes. The blender uses a quick disconnect valve, that replaces the oil pan plug.

The hose from the Blender is hooked up to the oil pan, using a quick disconnect coupling. The oil that is drawn from the oil pan is pumped through an ordinary fuel filter, and then into a separate external mixing container. As the mixing container receives the oil, fuel is fed into the container through a first temporary fuel hose that is placed into the fuel tank through the fuel cap opening. The fuel is mixed with the oil, and pumped back into the fuel tank through a second temporary oil/fuel mix hose. When the process is completed, the first and second temporary fuel hoses are removed from the fuel tank. The portable nature of the Blender causes some of the oil to drip from the connection points, once they are disconnected following the oil filtration. The fuel hoses allow fuel and oil to enter into the environment either through vaporization or as liquid waste.

The recycling system of the present invention allows a permanent processing apparatus to withdraw oil from the oil pan, filter the oil using a filter capable of removing particles as small as 3–5 microns in size, and directly deposit the filtered oil into the fuel tanks, where the necessary blending and mixing then occur. This apparatus is a closed system, that does not allow liquid or gaseous vapors or fuel to enter the environment as waste. The permanent positioning of this apparatus in a semi tractor trailer truck allows used oil to be recycled into the fuel at any desired time, whether or not the engine is at a construction site, or at a repair station.

SUMMARY OF THE INVENTION

It is an object of this invention to provide a permanently fixed used oil processing apparatus in vehicles or machines that permit the used oil to be combusted as a fuel component.

It is a further object of the present invention to provide a fixed apparatus that removes, filters and pumps used oil into the fuel supply system, to mix with the fuel, using a minimum of components and space.

Yet, another object of the present invention is to provide a fixed apparatus that can be used with an engine fueled by diesel fuel, gasoline, propane or other combustible gases.

Yet, another object of the present invention is to provide an environmentally compatible fixed apparatus that removes, filters and delivers used oil for mixture with fuel, using a closed system so that no oil or fuel, in either liquid or gaseous form, is released into the environment.

Yet, another object of the present invention is to provide an oil filtration system that can store an amount of used oil for delayed or controlled mixing with fuel.

In accordance with the above designs, the apparatus connects a hydraulic line or hose to the oil pan in place of the conventional oil pan plug. In the line is a shutoff valve that prevents the oil from drawing from the pan. A pump draws oil through the line, forcing it through a filter assembly, and then into the fuel system to mix the oil with the fuel.

Ordinary filters, such as those used to filter particles from fuel are able to capture matter that exceed 15 microns in size. Due to the increased level of particulate matter in used engine oil, it is desirable to capture and remove even smaller particles. If quantities of particulate matter mix with fuel in the fuel tank, they will either clog the fuel filter, or block the injectors. Particulate matter that reaches the cylinder can cause friction on the inner cylinder walls.

To properly filter the oil, it is pumped through a large filter that has a filtration capability of 3 to 5 microns. The filter can be a single removable component, that can be replaced once its filtration capacity has been reached. Existing filters for fuel or oil may be used for filtration, provided that they capture the necessary particle size.

Once the oil is filtered, it exits the filter assembly through a filter hose to mix with the fuel in the fuel system. The oil can mix with the fuel at a variety of points in the fuel system. The filter hose may connect directly into the fuel tank, in which the oil is dispersed throughout a sufficient quantity of fuel, so as to create a proper proportion of oil to fuel.

The oil may be mixed and combusted with liquid or gaseous fuels. The type of fuel will dictate the point at which the oil is mixed with it, and the proportionate amount of oil that is mixed with the fuel.

Oil mixes and burns with diesel fuel more effectively than with gasoline. The ratio of diesel fuel to oil must be at least 20:1, so that the amount of oil does not make up more than five percent of the total fuel. If the used oil is added to gasoline engines, then the ratio of gasoline to oil must be at least 160:1, so that the amount of oil does not make up more than 0.625 percent of the total fuel.

In many fuel systems using diesel, the filter hose can be connected directly to the fuel tanks. Many large trucks have two tanks that can hold a total of 200 gallons of fuel or more. The tanks are often attached to each other by a connecting line, that allows fuel from one tank to mix with the other. These tanks can receive all of the 10 gallons of used oil, and maintain the proper proportion of fuel to oil. The oil is added to one tank, and disperses throughout both tanks. The mixing of the fuel between the two tanks assists the dispersion of the oil in the fuel.

If the filter hose is connected to the return fuel line, it can be permanently connected using a T-connector. A check valve should be placed along the length of a filter hose that is connected to the return fuel line, to prevent fuel from flowing into the oil filtering apparatus when it is not in use.

If the filtered oil enters the fuel system at a point along the return fuel line, it will travel along the return fuel line feeding directly into the fuel tank. As the oil enters into the fuel tank, it mixes with the fuel so that the concentration of oil becomes fairly uniform throughout the fuel tank.

Although some diesel tanks for large engines can accommodate a total of two hundred gallons or more of fuel, many fuel tanks, both diesel and gasoline, have less capacity. If the fuel tanks do not have the capacity to accept all of the oil from the oil pan at one time, without exceeding the proper proportions of oil to fuel, a reserve oil container is used to store a portion of the used oil, until such time when new fuel is available to mix the oil with in proper proportions.

The reserve oil container is connected to the line that connects the oil pan to the fuel system. Preferably, it is connected to the filter hose. A three way three position valve is placed in the hose, which can be set so that the filtered oil flows directly to the fuel system, set so that the oil flows into the container, or set so that the oil can flow from the container back into the hose to the fuel system.

Since gasoline has such a high fuel to oil ratio, the oil in most instances will need to be stored in a reserve oil container until it can be slowly added to the fuel system. Excess oil can be added to the fuel system by either storing it in an oil container so that it can be added at a later time to the fuel tank in controlled amounts, or stored in the oil container and added to the fuel system below the carburetor in an atomized form. The atomized oil will mix with the fuel vapors prior to the fuel entering into the upper cylinder area.

If the oil is added to fuel vapors, a line connects the oil container to a separate apparatus, commonly known as a drip oiler, are used to control the amount of oil added below the carburetor. The oil is drawn into the area below the carburetor, as a result of the vacuum created in that portion of the fuel delivery system.

Engines that operate using fuels such as propane and other combustible gasses, often use top drip oilers to lubricate the upper cylinder areas. The oil container provides the supply of lubricant needed for use in these engine designs.

Use of the oil transfer and filtration system is easily accomplished, without any complicated setup or attachments. The location at which the oil is added to the fuel system is chosen as a result of the type of fuel, and size of the fuel tanks, if applicable. All that is necessary, is to ensure that any manually operated valves are properly opened or set, and a proper filter is installed before the pump is actuated. The oil is removed from the oil pan, filtered, and then fed into the fuel tank or oil container. When the oil has been completely filtered, and the requisite amount of oil has entered into the fuel system, or stored in the oil container until needed, the pump's operation is halted.

Maintenance is limited to the replacement of the filter. The closed system does not have any points at which liquid oil will leak into the environment during or following the oil filtration process, nor is any unnecessary uncombusted gaseous fuel or oil allowed to escape into the atmosphere.

The consumption of the oil and fuel mixture, or the addition of the oil through the manifold, will increase the usable life of the engine, as the slight concentration of oil will lubricate and coat the interior walls of the upper cylinder areas. Since this apparatus is built-in to the engine and fuel system, engine users will be more likely to dispose of used oil properly, so that it does not enter the environment in a liquid form.

DESCRIPTION OF THE PREFERRED EMBODIMENT

Figure 1:
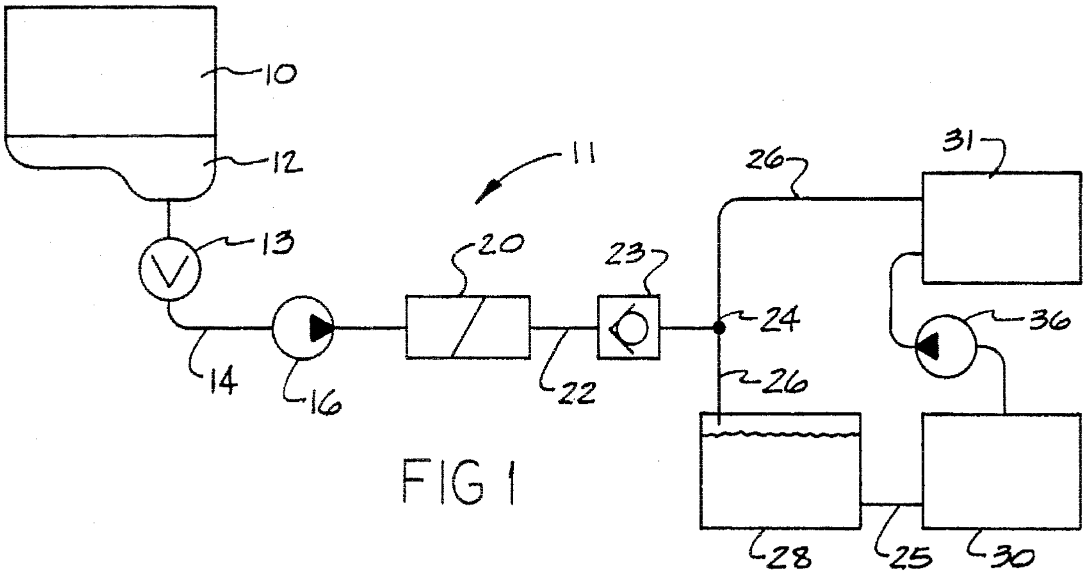
FIG. 1 depicts a diagram of the oil filtration system that hooks into the return fuel line on a double tank fuel system.
Figure 2:
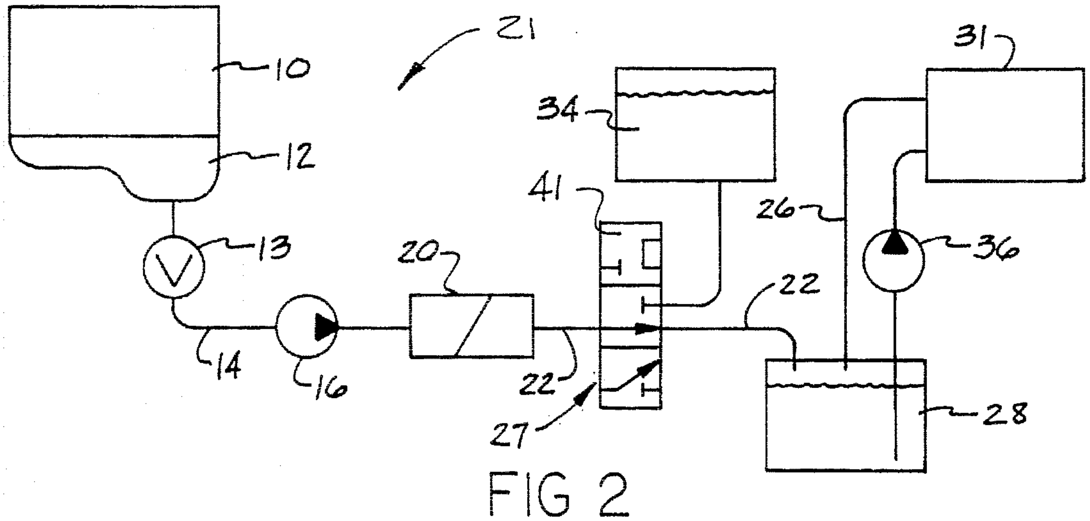
FIG. 2 depicts a diagram of the oil filtration system having an oil container for an undersize fuel tank.
Figure 3:
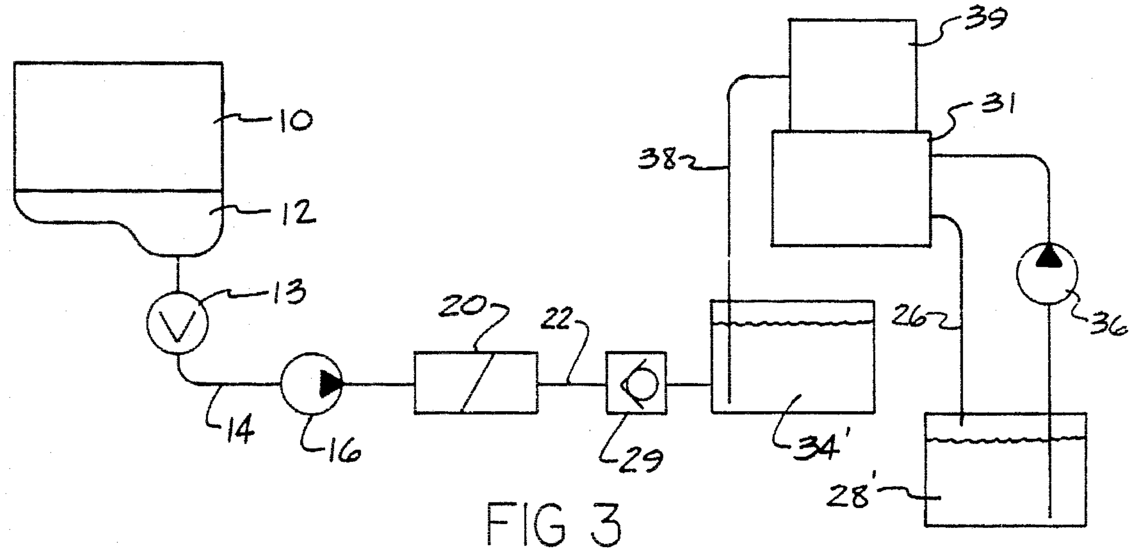
FIG. 3 depicts a diagram of the oil filtration system having an oil container that feeds into a drip oiler.

Referring to FIG. 1, 2, and 3, there is shown a closed filtration system, permanently attached at one end to the oil pan 12 of an engine 10, and to one of several points in the fuel system on the other end, being either the return fuel line 26, the fuel tank 28, or a drip oiler 39.

The oil pan 12 serves as a reservoir for oil used to lubricate the engine 10 during its operation. As the oil in the pan 12 lubricates the engine, it is exposed to combustion by products and dirt in particulate form, that remains suspended in the oil until filtered. When the oil becomes too dirty, it becomes necessary to replace it with new oil.

The used oil is removed through the base of the pan 12, through shutoff valve 13. The valve 13 comprises a manually operated ball type valve, or the equivalent which is inserted into the drain plug opening of pan 12.

A hose or hydraulic line 14 connects the shutoff valve 13 to the pump 16, which pumps oil through filter 20. The oil exits the filter 20 into hose 22. The oil in hose 22 enters into the fuel system at the return fuel line 26, as shown in FIG. 1; into the fuel tank 28, as shown in FIG. 2; or to a drip oiler 39, as shown in FIG. 3.

OPERATION

When the pump 16 is actuated, and valve 13 is open, the pump 16 draws oil from the pan 12, through the line 14. The pump 16 can be a positive displacement or centrifical type of pump which pumps oil through a filter 20, that captures particulate matter in the oil less than 3–5 microns in size.

The filter 20 is permanently fixed in the system having a replaceable filter cartridge. Conventional filter cartridges may be used, provided that they exhibit the filtration capacity designated above. The filter cartridge is replaced when it loses its filtration capability.

The oil exits the filter 20 into a filter hose 22, that connects to the fuel system. The point at which the oil enters the fuel system depends on the type of fuel used and/or the capacity of the fuel tank 28 in relation to the amount of oil being filtered.

In fuel systems using diesel fuel, where the fuel tank 28 has a fuel capacity at least twenty times as great as the amount of oil being filtered, the filtered oil is fed into the fuel tank 28 either directly, or via the return fuel line 26.

When the filtration system 11, of FIG. 1, connects to the fuel system at the return fuel line 26, the filter hose 22 is fixed to the return fuel line 26 through a T-connector 24. The hose 22 has a check valve 23 along its length, to prevent fuel from backing up into the filtration system 11 when not in use. If the filter hose 22 is connected directly to the fuel tank 28, a check valve 23 is not required.

In diesel fuel systems having a second fuel tank 30, the two fuel tanks 28 and 30, are often attached through a connecting line 25 that allows fuel to flow between the tanks. This transfer of fuel between the tanks assists in the mixing of the oil with the fuel.

After the filtered oil empties from the oil pan 12, the pump 16 is shut off and the shutoff valve 13 is closed. Engine 10 is ready to receive a fresh charge of oil through its conventional means.

The fuel injection system 31 is conventional in type and well known in the prior art, and is therefore not shown in detail. The fuel injection system, shown in FIG. 1, 2 and 3, includes a constant flow pump 36 which pumps from either the fuel tank 28, or the secondary tank 30. The excess flow in the injections system 31, that is not used, flows back in return line 26 into the fuel tank 28.

While engine 10 is running, there is always flow in return line 26, which provides additional mixing and circulation of the fuel and oil that was pumped into the fuel tank 28. This circulation provides adequate overall mixing of the fuel and oil.

Oil mixes and burns with diesel fuel at lower ratios than is required for gasoline. The ratio of diesel fuel to oil must be at least 20:1, so that the amount of oil does not make up more than five percent of the total fuel. If the oil is added to gasoline, then the ratio of gasoline to fuel must be at least 160:1, so that the amount of oil does not make up more than 0.625 percent of the total fuel.

Referring to FIG. 2, if the fuel tank 28' holds insufficient fuel to properly accommodate all of the oil from an oil change, in the necessary proportions, an additional valve is utilized. A three-way three position valve 27 is located in hose 22. When the necessary amount of fresh fuel is available for the oil to mix with, the valve 27 can be set in the position shown in FIG. 2, so as to allow oil to flow from the engine oil pan 12 to the fuel tank 28'. When the fuel tank 28' is not large enough to take all of the oil form the oil change at once, valve 27 is moved to its position 40, and the excess oil is pumped into container 34. When the fuel tank 28' is empty and another charge of oil is desired to mix with fresh fuel, valve 27 is moved to position 41 to add the appropriate amount of oil. This system 21, could also have the line 22 connect to the return fuel line 26 if desired.

In fuel systems that operate using gasoline, the addition of oil to the fuel in proper proportions may be difficult to monitor. If the engine 10, as shown in figure 3, is powered by propane, natural gas, or other gaseous combustibles, the oil is filtered and stored in the container 34', which is then fed through a drip line 38 into a drip oil system 39 that feeds the oil into the fuel system 31, at a point below the carburetor with the engine vacuum pressure, but before the fuel enters into the upper cylinder area. When a drip system is used, check valve 29 prevents the backflow of oil out of container 34'.

The drip oil system 39 is conventional in type and well known in the prior art, and is therefore not shown in detail. The oil is generally mixed with the fuel in atomized form, below the carburetor, generally at the same location as a conventional PCV valve which allow burning of crankcase vapors.

From the foregoing statements, summary and description in accordance with the present invention, it is understood that the same are not limited thereto, but are susceptible to various changes and modifications as known to those skilled in the art and we therefore do not wish to be limited to the details shown and described herein, but intend to cover all such changes and modifications which would be encompassed by the scope of the appended claims.

I claim:

1. A used-oil disposing system permanently attached to a fuel tank and an oil pan sump of an engine in a vehicle for disposing of the engine crankcase oil, said engine including a conventional fuel system having fuel injection means, a main fuel line for fluidly connecting said fuel injection means to said fuel tank, a constant flow pump disposed in said main fuel line for pumping fuel from said fuel tank to said fuel injection means, and a return line for returning excess fuel from said fuel injection means to said fuel tank, the improvement comprising:

a hydraulic line connecting the oil pan sump to the said return line;

a normally closed shut off valve positioned in said hydraulic line retaining the motor oil within the oil pan during normal engine operation, and for permitting oil to flow therethrough when opened during engine shutdown;

an auxiliary pump means positioned in said hydraulic line selectively activated to pump the used motor oil through said shutoff valve from the oil pan sump into the the return line during engine shutdown;

filter means in said hydraulic line upstream of said return line, for filtering particulate matter from the oil prior to entry into said return fuel line;

whereby opening of said shutoff valve and activation of said auxiliary pump means causes oil to flow from said oil pan sump, through said shutoff valve, through said auxiliary pump means, through said filter, into said return line, and into said fuel tank to be mixed with fuel contained therein.

2. A used oil disposing system, as set forth in claim 1, including check valve means disposed in said hydraulic line between said filter means and said return line to prevent backflow of fuel into the oil pan sump.

3. A used-oil disposing system, as set forth in claim 1, wherein the filter means removes particulate matter exceeding 3 microns in size.

4. A used oil disposing system as set forth in claim 1 wherein the fuel system includes at least two fuel tanks and the return line is connected to the first fuel tank, wherein the constant flow pump draws from the second fuel tank, and means for providing cross flow between the first and second fuel tanks.

* * * * *